H. FLAD & G. P. HERTHEL, Jr.
HYDRAULIC ELEVATOR.
No. 65,200. Patented May 28, 1867.
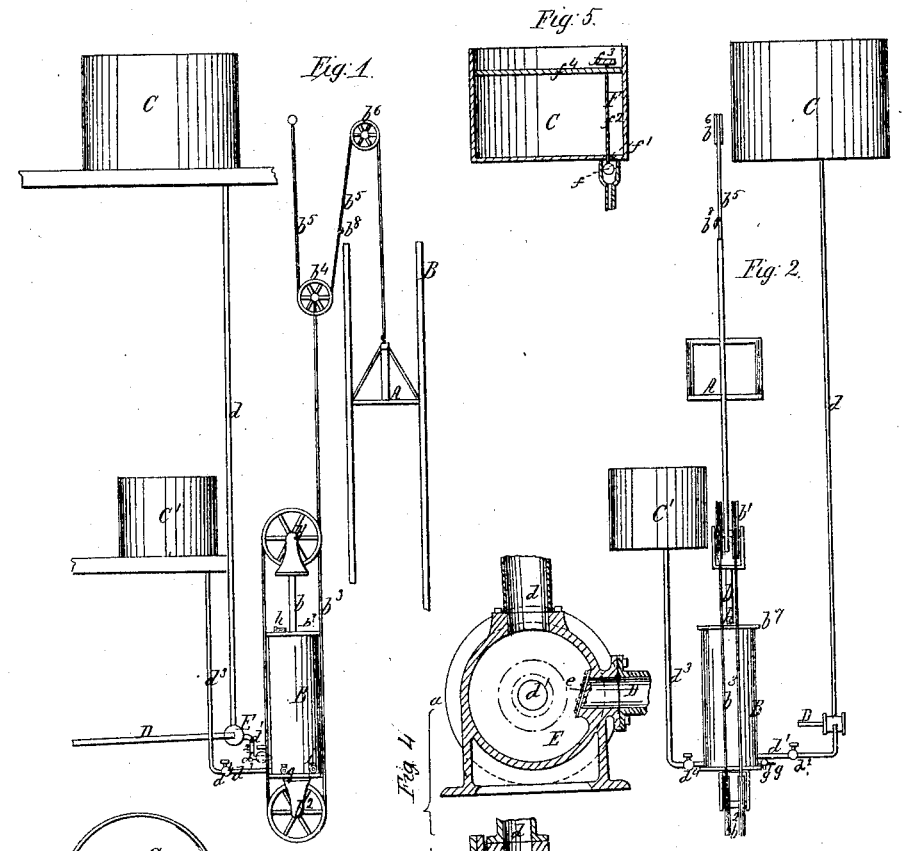

United States Patent Office.

HENRY FLAD AND GEORGE P. HERTHEL, JR., OF ST. LOUIS, MISSOURI.

Letters Patent No. 65,200, dated May 28, 1867.

---

IMPROVEMENT IN HYDRAULIC ELEVATORS.

*The Schedule referred to in these Letters Patent and making part of the same.*

---

TO ALL WHOM IT MAY CONCERN:

Be it known that we, HENRY FLAD and GEORGE P. HERTHEL, Jr., both of the city of St. Louis, county of St. Louis, State of Missouri, have invented certain new and useful improvements in Hydraulic Elevators; and we do hereby declare the following to be a full and exact description of the nature, construction, and method of application thereof, reference being had to the accompanying drawings, and to the letters of reference marked thereon. Of said drawings—

Figure 1 is a general front elevation.

Figure 2 is a general side or end elevation.

Figure 3 is a general plan, showing the general arrangement and application of our said improvement; and Figures 4 and 5 are detail elevations of certain parts hereinafter more specially referred to and described.

The general nature of our said invention is in the application of hydraulic or fluid pressure to raise weights or produce motion in such wise that the quantity of fluid used shall be less, and the pressure thereof be applied more advantageously than in the arrangements of devices in use before our said improvements. The manner of accomplishing these features forming said general nature of our invention will, from the following detail description, more fully appear.

In order to show the practical operation of our said improvements, we will describe the application of our improved "elevator" to raise weights placed as in the usual manner upon a platform represented by A in said figs. 1, 2, and 3. We connect said platform A by means of ropes or chains, and sheaves, or by means of shafting and gear-wheels, with the piston of a cylinder, B, and this we connect by means of pipes with one or more tanks or reservoirs, C C'; and the one of said tanks C standing at greatest height we connect by means of a feed pipe with the fluid-supply pipe D.

In the usual applications of our said "elevator" the fluid used is water supplied by the mains or distributing pipes of a city water-works; but a special supply source may be created either by using water drawn from high grounds or by water supplied by the pumps of a common steam engine. In all these cases the fluid is furnished in the supply or feed pipe D, under a certain pressure which forces the same to rise from said pipe D through a pipe, $d$, into the tank C. Now, when the feed pipe D receives fluid from the distributing mains of a city water-works, the pressure or head of said fluid will vary in accordance with the supply of fluid to the city generally, and with the quantity of fluid drawn from the distributing mains for other purposes. Usually in the night time and on holidays the demand for water in cities is reduced below the demand at other times. The supply being supposed constant, the pressure of the water in the distributing mains is then increased, and the fluid will then fill a tank placed at proper height, as shown by C, in figs. 1 and 2. By thus placing the tank C at a height corresponding to the higher pressures in the distributing mains, the supply of fluid in C may be advantageously used, owing to its great head, to raise weights in the manner hereinafter detailed. It becomes necessary, however, to prevent the reflow of the fluid stored in said tank C, through the pipes $d$ and D, when the pressure in D reduces below that needed to cause the filling of said tank. This we accomplish by introducing a box, (which, on account of certain other uses to which it is applied, we call a distributing-box,) E. To said box we join in a fluid-tight manner the pipes D and $d$. The opening in the side of said box E, through which the fluid passes from D into the box E, is closed by a valve, $e$, (opening towards the interior of E,) as fully shown in the detail elevations comprising fig. 4, and severally marked $a$ and $a^1$. The valve $e$ may be a common leather flap-valve, strengthened by wrought-iron plates, as in the drawings indicated. It will be seen that whenever the pressure of fluid in D is greater than that in E, the valve $e$ opens, and the fluid passes into E, and through the connection of E with the pipe $d$, into $d$, and from this into the high tank C. (Owing to other distributing pipes which enter into E, this may not always occur, however, as will yet be explained.) If, however, the tank C be previously filled, a flow of water into the same, through the great pressure in D, would cause the fluid in C to overflow and waste. This to prevent we have constructed the check-float valve F, as fully shown in fig. 5. This check-float valve F has a check or stop, $f$, which, when closing and checking the fluid-flow to C, bears against a seat, $f^1$, arranged in the valve-chamber below or near the bottom of C. The stop $f$ is connected by a rod, chain, or rope, $f^2$, with a float, $f^3$; this rests upon the upper surface of the fluid in C. To properly guide $f$ in its vertical motion, we use the guide-frame $f^4$, through which $f^2$ passes. This frame may be so arranged that the float $f^3$ may rest thereon when the fluid in C sinks very low, and thus the check $f$ will be prevented by the rod or rope $f^2$ from dropping farther than advantageous. Whenever, then, the fluid in C rises to the greatest allowable height, the same carrying up the float $f^3$, draws up with it the check $f$, and closes the opening from $d$ to C, thereby preventing further inflow of fluid to C, and preventing the fluid in C from waste by overflow, as above stated.

All the parts comprising the device F are made of the usual materials, and of the forms indicated in fig. 5

The fluid stored in C, whenever it is intended to perform the work of raising the weights upon the platform A, passes down the pipe $d$, through the distributing-box E, and from this through the pipe $d^1$ to the cylinder B, entering beneath the piston. If, however, the pressure in D is greater than that in $d$, the fluid supply is from D direct, the valve $e$ being then opened. The feed pipe $d^1$ has a stop-cock, $d^2$, which regulates the flow of fluid to the cylinder. By the influx of fluid the piston $b$ of the cylinder B is raised.

In the special form of our elevator shown in the drawings, we have arranged two sheaves, $b^1$, at the upper end of the piston-rod, and two more sheaves $b^2$ at the bottom of the cylinder B. We have further passed over these sheaves a rope or chain, $b^3$. One end of this is permanently fastened, and the other end connects with a running sheave, $b^4$. Now, when the piston $b$ is raised by the fluid, the sheaves $b^1$ and $b^2$ act, as usual in the compound pulley, to give the running sheave $b^4$ a motion through a fourfold distance of the one performed by the piston $b$. We furthermore secure one end of a rope or chain, $b^5$, permanently, and pass the same around the running sheave $b^4$, and thence over a permanent sheave, $b^6$, and thence down until the rope is secured to the platform A. In this manner the platform A is drawn through a distance which is made eight times that of the stroke of the piston $b$. But it will be seen that by many and various applications of gearing and shafting, or of compound pulleys, the relation of the piston-stroke to the travel of the platform may be varied, and this is fully accomplished in many arrangements in present use. In order, however, to vary the application of the power of fluid in B to the platform A, we have arranged on the rope or chain $b^5$ a loop or ring, $b^8$. When, therefore, it be required to raise a very great load on A to a comparatively small height, we connect the rope $b^3$ with $b^5$ by said ring $b^8$, after having disconnected $b^3$ from the running sheave $b^4$. Thus, $b^3$ and $b^5$ act as one rope in drawing up A, and the power exerted to raise A and the load thereon is doubled.

Now, in the usual applications of elevators or hoists in stores, on docks and wharves, very heavy freight is raised to smaller heights for convenience of handling and safety in storage, and lighter weights of freights are, on the other hand, raised to greater heights. Thus, therefore, by arranging our said improved elevator in such wise that the same power is exerted to raise the heavier loads through a smaller height, and the lighter loads through a greater height, we have adapted our said invention advantageously to the practical necessities of its application. We have, therefore, as stated in the nature of our invention, applied the power used more advantageously than has heretofore been done.

After a load has been raised, and the platform A is to be lowered, we discharge the fluid in B through a waste pipe, $g$, regulating said discharge by a stop-cock, $g^1$, it being plain that in the inverse manner in which, by influx of fluid to B, the platform A is raised, the efflux of fluid from B will permit the platform A to descend. In case, however, the platform A is to be lowered with a weight thereon, the pressure caused by weight of A, and the load thereon, may be advantageously used as a source of power for the raising of other weights. To effect this we have arranged in the manner following:

By the falling platform and the load thereon, the fluid in B is forced out of B through a return pipe, $d^3$, (the flow being regulated by a stop-cock, $d^1$,) and into a second tank or reservoir, C', placed at proper height, and of sufficient capacity to receive the fluid contained in B. When, now, the platform A is again to be raised, the fluid stored in C', which has been saved from waste, may be advantageously employed to raise the piston $b$ of B by allowing the fluid to repass through $d^3$, the stop-cock $d^4$ being herefor opened, and pass into B.

It will thus be seen that by arranging one or more tanks C to receive fluid from the first supply sources at such times when the pressure is a maximum, we have advantageously adapted our said elevator to receive, store, and furnish fluid at the maximum pressure; and, secondly, by arranging one or more tanks C' to receive fluid from the cylinder B, when descending weights can force fluids thereto, we have adapted our said elevator to prevent waste, and advantageously re-employ the fluid thus saved; and that hence by said arrangement of said tank or tanks C, and said tank or tanks C', we have greatly reduced the quantity of fluid needed in the raising of weights, and have therefore fully secured the advantage hereinbefore first stated in the nature of said invention.

Sometimes it may be desirable to raise great loads to great heights. To effect this in the economical manner claimed as in the nature of our invention, we have arranged as follows: In the cover of the cylinder B, or in the walls of B, near the upper end thereof, we arrange the valve $h$, opening outwardly from the cylinder. This may be a common flap or ball-valve of the usual materials. The cover $b^7$ of B being secured thereon in an air-tight manner, and the rod of the piston $b$ passing through a proper stuffing-box in $b^7$, and moreover the piston $b$ fitting in B in a fluid and air-tight manner, (as in the usual hydraulic packings,) whenever the piston $b$ rises in B, the air above the piston will be forced out of B through the valve $h$. When, then, the piston $b$ descends, the air being prevented from re-entering into the space above $b$, a partial vacuum is formed, and thus in the next up stroke such part of the atmospheric pressure as corresponds to the partial vacuum above $b$, will be added to the fluid pressure under $b$, acting to raise A and the load thereon. Hence a greater load can be raised (owing to said added atmospheric pressure) to a height corresponding to the stroke of the piston, and the multiplication of pulleys above described. Moreover, in the now following down stroke the fluid can again be received in the tanks C', in case the action of a weighted platform, A, is sufficient hereto. Thereupon, however, it is not necessary to use the fluid thus saved from waste in C', but simply by admitting air below the piston $b$ through a proper stop-cock, $i$, the platform A may be raised. Therefore, by the application of an air-efflux valve, $h$, and an air-influx valve, $i$, such part of the atmospheric pressures as the effective action of stuffingboxes, valves, and packings, and other contingencies of construction will allow, may be added to the pressure of fluid supplied from the other sources heretofore described, and in certain cases the said atmospheric pressure of itself can be advantageously used to raise weights, so as to fully secure for our said invention the advantages heretofore claimed to be in the nature thereof.

Having thus fully described our said invention, what we specially claim, and desire to secure by Letters Patent, is—

1. The combination of the cylinder R, piston $b$, sheaves $b^1$ $b^2$, and system of pulleys, as arranged in relation to the reservoir C, or supply pipe D, and its connecting pipe $d$, substantially as shown and described.

2. The arrangement with the foregoing of the secondary reservoir C', substantially as and for the purposes shown and described.

HENRY FLAD,
GEO. P. HERTHEL, Jr.

Witnesses:
M. RANDOLPH,
S. M. RANDOLPH.